Jan. 29, 1957
L. H. FLORA
2,779,377
HOLDER FOR FASTENING DEVICE
Filed Nov. 30, 1953
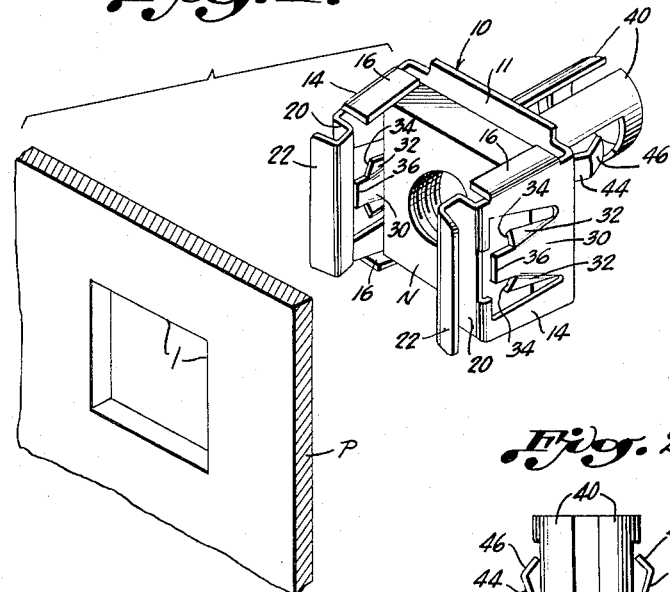
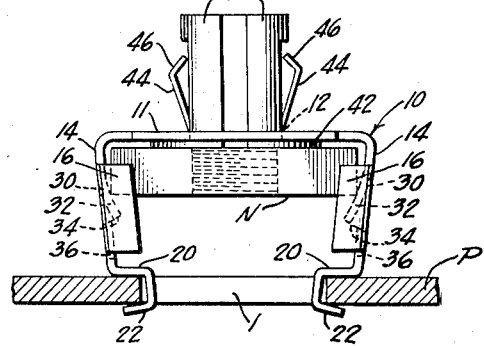
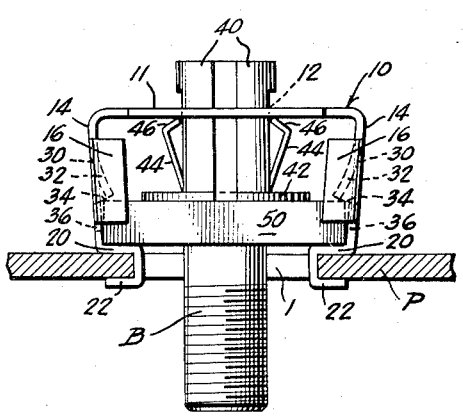
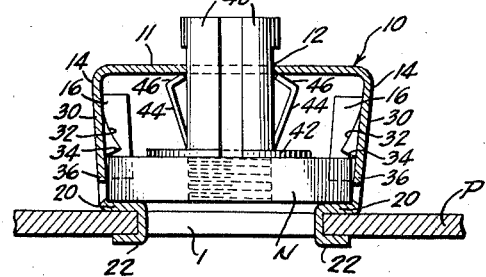
INVENTOR
LAURENCE H. FLORA
BY
*H. S. Lombard*
ATTORNEY

United States Patent Office 2,779,377
Patented Jan. 29, 1957

2,779,377

HOLDER FOR FASTENING DEVICE

Laurence H. Flora, Cleveland, Ohio, assignor to Tinnerman Products, Inc., Cleveland, Ohio, a corporation of Ohio Application November 30, 1953, Serial No. 395,080

3 Claims. (Cl. 151—41.76)

This invention relates in general to nut and bolt fastened installations and deals, more particularly, with improvements in fastening devices for attaching a nut or bolt in fastening position in an installation prior to the application of the cooperating bolt or nut thereto for securing the parts of the installation.

In many assemblies, it is necessary or desirable to use a standard nut and bolt fastening device but it is usually a difficult problem, especially in blind locations, for the operator to hold the bolt or nut in place as the cooperating fastener is applied thereto, or otherwise, to maintain the same against relative rotation during the final tightening of the fasteners. In such an assembly in which the rearward side of a part is not conveniently or readily accessible for holding a bolt or nut in fastening position prior to the application of the cooperating fastener, it has been the practice to resort to various forms of cage devices requiring a welding or riveting operation for attaching the same in providing means for holding the nut or bolt in fastening position. A welding or riveting operation requires inordinate time for attachment of the fasteners and, otherwise, involves considerably increased costs in manufacture which often make the use of this type of holder prohibitive in many installations requiring a cheap and inexpensive fastening means.

In United States Patent Number 2,391,046 issued December 18, 1945, there is disclosed a general form of nut holder which is installed in attached position on a support by an easy clip or snap fastening procedure that is much quicker and considerably cheaper than that involved in the use of the aforementioned cage devices requiring a costly and time consuming riveting or welding operation. In the use of nut holders constructed in accordance with this patent, it has been found in applications wherein a power driver is employed to apply a bolt into a previously attached nut, for example, that the impact of the power driver in the initial application of the bolt to the nut occasionally causes a displacement of the nut and nut holder from proper attached position. In accordance with the present invention, such nut holders and bolt holders are so constructed as to provide a positive permanent lock of the holder and the nut or bolt retained thereby in attached position and capable of withstanding such impact of a power driver or other force that might have a tendency to displace the nut or bolt from proper and effective attached position.

A primary object of this invention, therefore, is to provide a fastening device embodying a sheet metal holder for a nut or bolt head or other work clamping member, which comprises clip or snap fastened attaching means in the form of hooks, or the like, for retaining the nut or bolt head in a work opening together with an insert included in the fastening device for providing an axial force on the top of the nut or bolt head in the application thereof to fully attached fastening position in which said insert serves also to lock the nut or bolt head in such fully attached fastening position.

Another object of the invention is to provide a fastening device, as described, comprising a holder or retainer for a nut or bolt head or other work clamping member, which includes attaching means in the form of resilient arms carrying hooks, or the like, for retaining the nut or bolt head in a work opening together with an insert included in the fastening device for providing an axial force on the top of the nut or bolt head in the application thereof to fully attached fastening position and for locking the nut or bolt head in such fully attached fastening position, and with locking shoulders provided on said spring arms of the holder adapted to engage the nut or bolt head to lock the same in fully attached fastening position in cooperation with said insert.

A further object of the invention is to provide a fastening device including such a holder for a nut or bolt head in which the attaching arms and hooks thereon are adapted to be positively retained in attached position by manipulation of the nut or bolt head to expand said hooks into anchored relation in the work opening together with an insert included in the fastening device for providing an axial force on the top of the nut or bolt head in the application thereof to fully attached fastening position and for locking the nut or bolt head in such fully attached fastening position, and with locking shoulders provided on said arms of the holder adapted to engage the nut or bolt head to lock the same in fully attached fastening position in cooperation with said insert.

Further objects and advantages, and other new and useful features in the construction, arrangement and general combination of elements of the improved fastening devices of the invention will be apparent as the following description proceeds with reference to the accompanying drawings, for purposes of illustration but not of limitation, in which like reference characters designate like parts throughout, and in which:

Fig. 1 is a perspective view showing an assembled nut and nut holder in accordance with the invention in position to be attached in a work opening in a supporting plate or panel, or the like;

Fig. 2 is a sectional view through the supporting part showing the assembled nut and nut holder in side elevation as initially attached in the work opening and ready for application to fully attached fastening position by the insert included in the fastening device; and, Fig. 3 is a vertical sectional view showing the nut as applied to its fully attached fastening position in which the insert serves to lock the same in such fully attached fastening position in cooperation with locking shoulders on the arms of the holder;

Fig. 4 is a sectional view showing the holder of Figs. 1–3, inclusive, as employed for retaining a bolt in fully attached fastening position.

Referring now, more particularly, to the drawings, Figs. 1–3, inclusive, show a fastening device in accordance with the invention as provided for use as a holder or retainer for a nut N. The holder 10 is constructed from a sheet metal section of a size and configuration determined by the shape and size of the nut N with which it is to be used and may be readily provided for use with various other nuts or equivalent work clamping members such as the head of a bolt B, as illustrated in Fig. 4, for example.

In the present example, the holder 10 is shown as constructed for use with the standard threaded nut N to be attached in fastening position over a generally rectangular work opening 1 in a supporting part such as a panel or plate P. The holder 10 may be readily constructed for attachment in a circular hole or other opening of any selected design but the use of a generally rectangular work opening, as shown, is advantageous in that it is relatively simple to form and otherwise provides for a fixed nonrotative attachment of the nut and nut holder in attached position.

The nut holder 10, is provided from a blank of any suitable sheet metal such as spring metal or cold rolled metal having spring characteristics. The sheet metal blank forming the holder 10 is bent to provide a central base or body portion 11 having a bolt passage 12 and end portions extending in the same general direction to define a pair of resilient arms 14 or end walls substantially normal to said central base portion 11 at the opposite ends of said nut N. The arms 14 are provided with side tabs or lugs 16 extending inwardly toward each other at the opposite sides of said nut N, and the lower end portions of said spring arms 14 are bent to define inwardly extending bottom wall portions 20 below said nut N merging with outwardly directed hooks 22, or the like, which are of a reduced width corresponding substantially to the width of the panel opening 1 so as to be readily received therein.

In the normal untensioned relation of said arms 14, the hooks 22 are spaced apart a distance greater than the length of the panel opening 1 and are provided in a predetermined spacing from the bottom wall portions 20 corresponding substantially to the thickness of the panel P adjacent the panel opening 1 so as to cooperate with said bottom wall portions 20 in clasping marginal portions of said panel opening 1 in frictional engagement therewith. The arms 14, otherwise, extend from the central base or body portion 11 in entirely free and independent relation so that they may be readily flexed as necessary for an easy and quick initial attachment of the hooks 22 with the marginal portions of said panel opening 1, as shown in Fig. 2.

In the general form of holder 10, thus provided, the spring arms 14 may be spread apart as necessary to slip the nut N through the space between the hooks 22 on the ends thereof to a position in which the holder retains the nut N in the manner of a cage device defined by said arms 14, the side tabs or lugs 16 and the bottom wall portions 20, with the threaded opening in the nut N in line with the bolt passage 12 in the base 11 of the holder.

The arms 14 have the walls thereof stamped to provide locking elements in the form of resilient fingers 30, or the like, extending generally lengthwise of said arms 14. The fingers 30 are bent substantially in the form of corrugations defining inwardly projecting wing portions 32 along the sides of said fingers terminating in inwardly projecting shoulders 34 on the ends of said wings 32. The shoulders 34 project inwardly from the walls of said arms 14 and are provided on said fingers 30 at predetermined locations as necessary to engage the top of the nut N in its fully attached fastening position in the work opening 1, as shown in Fig. 3. The lower free ends of said fingers 30 define abutments 36 between said shoulders 34 and these abutments 36 are adapted to engage the end faces of the nut N in cooperation with said shoulders 34 engaging the top of the nut N in said applied fastening position of the nut N, as shown in Fig. 3.

The nut holder 10 is provided with an insert 40 for applying the nut N to its fully attached fastening position and for providing a locking action on said nut in such fully attached fastening position in cooperation with the shoulders 34 on the fingers provided on the arms 14 of the holder. The insert 40 is provided from a suitable blank of sheet metal rolled into a split tubular sleeve having a disc-like flange 42 on its inner end and two or more longitudinal spring legs 44 stamped from the walls of said sleeve. The spring legs 44 are integral with the sleeve adjacent the flange 42 and extend outwardly in diverging relation in the manner of guide surfaces leading to inwardly extending shoulders 46 formed on the free ends of said legs 44. The arrangement is such that the split tubular sleeve is received in and extends through the passage 12 in the base 11 of the holder with the flange 42 positioned between the inner side of said base 11 and the top of the nut N, as shown in Fig. 2, and with the body of the split tubular sleeve including the spring legs 44 projecting from the outer surface of said base 11.

The assembled nut and nut holder, Fig. 1, accordingly, is adapted to be easily and quickly applied to initially attached position in the panel opening 1, Fig. 2, simply by compressing the arms 14 of the holder to move the hooks 22 on the ends thereof inwardly toward each other. In this relation, to obtain the required inward flexing of the arms 14, the nut N is held against the flange 42 of the insert 40 adjacent the base 11 of the holder by the engagement of the edges of the wings 32 with the lower corners of said nut N. When the spring arms 14 are compressed, the hooks 22 still have their extremities farther apart than the length of the panel opening 1. Accordingly, in attaching the nut holder 10, one hook 22 is passed through the opening 1 with the other hook 22 resting on the surface of the panel adjacent said opening 1. The resilience of the arms 14 enables the latter hook 22 to be pressed inwardly and sprung sufficiently so that it may also be received in said panel opening 1. The spring arms 14 are then released from their compressed condition and in attempting to assume their normal untensioned relation, both hooks 22 spread apart and engage the adjacent marginal edges of the panel opening 1, as shown in Fig. 2, to retain the nut and nut holder 10 in initially attached position. The spring arms 14, as thus initially attached, do not assume their normal untensioned relation but rather, remain tensioned and inclined inwardly toward each other in the engaged position of the hooks 22 in the panel opening 1, and with the nut N retained in spaced relation to the panel P by the engagement of the edges of the wings 32 on the fingers 30 of the holder with the lower corners of the nut N, as aforesaid.

In such initially attached position of the fastening device as shown in Fig. 2, a suitable force is applied to the outer end of the tubular insert 40, as by hammer blows, or the like, to drive said insert 40 axially inwardly to the position shown in Fig. 3, where the nut N is seated on the bottom wall portions 20 of the holder in bearing relation to the panel P. The arrangement is such that when the insert 40 is driven axially inwardly under the hammer blows or other force on the outer end thereof, the spring legs 44 gradually contract inwardly against the edges of the passage 12 in the base 11 of the holder as necessary for said legs 44 to pass through and clear said passage 12, as seen in Fig. 3, whereupon said legs 44 spring outwardly to seat the shoulders 46 thereon in positive engagement with the marginal edges of said passage 12 at the inner side of the base 11 of the holder. The insert 40 is thus locked in its applied position by the shoulders 46 with the flange 42 bearing on the top of the nut N to lock said nut N in its fully attached fastening position in bearing relation to the panel P, as shown in Fig. 3.

As the nut N is thus actuated from the position shown in Fig. 2 to that of Fig. 3, the end faces of said nut N slide on the guide surfaces defined by the edges of the wings 32 to cause said wings and the fingers 30 to flex outwardly as necessary to permit said end faces of the nut N to pass over said shoulders 34 to the fully attached position of the nut as shown in Fig. 3. The fingers 30 and said shoulders 34 thereupon spring inwardly in attempting to assume their normal untensioned relation in a manner whereby said shoulders 34 snap into positive engagement with the top of the nut N, as shown in Fig. 3, with the abutments 36 on the ends of said spring fingers 30 engaging the adjacent end faces of the nut N to rigidify the positive engagement of said shoulders 34 with the top of said nut N. The actuation of the nut N from the position shown in Fig. 2 to that of Fig. 3, otherwise, is such that the end faces of said nut N engage the inwardly inclined arms 14 of the holder to expand the same and force the hooks 22 thereon outwardly in opposite directions to anchored relation in the panel opening 1, as shown in Fig. 3.

This anchored relation of the hooks 22 in the panel opening 1 serves to lock the holder 10 fixedly and rigidly in fully attached position and takes place simultaneously with the locking action on the nut N provided by the shoulders 34 on the fingers 30 of the holder in conjunction with the locking action of the shoulders 46 on spring legs 44 of the insert 40, as aforesaid. There is thus provided a positive permanent lock of both the nut N and its holder 10 in fully attached position against displacement by any likely force which might otherwise cause dislocation or removal thereof from such fully attached position, as for example, when subject to a severe impact taking place in the use of a power tool for applying the associated bolt to said nut N.

As shown in Fig. 4, the improved holder 10 is equally adapted to use as a retainer for a bolt B having a head 50 approximating the size and proportions of the nut N which is used as disclosed with reference to Figs. 1–3, inclusive. The head 50 of the bolt B is readily assembled in the holder 10 between the spring arms 14 together with the insert 40, and this assembly easily and quickly attached in the panel opening 1 and applied to fully attached fastening position by a suitable force on the outer end of the insert 40 to lock said bolt and its holder in the panel opening 1 in the same general procedure described with reference to Figs. 1–3, inclusive.

While the invention has been described in detail with specific examples, such examples are intended as illustrations only inasmuch as the invention fully contemplates various modifications which may be provided without departing from the spirit and scope of the invention.

What is claimed is:

1. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers included in the holder engaging the nut or bolt head and retaining the same adjacent said base in the initially attached position of the fastening device in the work opening, a movable member extending from the top of the nut or bolt head through said passage in said base and projecting outwardly from said base, said movable member being adapted to be actuated to move said nut or bolt head axially toward the work from said initially attached position to fully attached position in which the ends of the nut or bolt head expand said outwardly directed attaching elements into positive engagement with the marginal portions of the work opening, said resilient fingers comprising shoulders adapted to engage and lock the nut or bolt head in such fully attached position.

2. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers included in the holder engaging the nut or bolt head and retaining the same adjacent said base in the initially attached position of the fastening device in the work opening, a movable member extending from the top of the nut or bolt head through said passage in said base and projecting outwardly from said base, said movable member being adapted to be actuated to move said nut or bolt head axially toward the work from said initially attached position to fully attached position in which the ends of the nut or bolt head expand said outwardly directed attaching elements into positive engagement with the marginal portions of the work opening, said movable member having a resilient shoulder adapted to engage a marginal portion of the passage in the base of the holder to retain said member as a locking means on the nut or bolt head in said fully attached position.

3. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers included in the holder engaging the nut or bolt head and retaining the same adjacent said base in the initially attached position of the fastening device in the work opening, a movable member extending from the top of the nut or bolt head through said passage in said base and projecting outwardly from said base, said movable member being adapted to be actuated to move said nut or bolt head axially toward the work from said initially attached position to fully attached position in which the ends of the nut or bolt head expand said outwardly directed attaching elements into positive engagement with the marginal portions of the work opening, said resilient fingers comprising shoulders adapted to engage and lock the nut or bolt head in such fully attached position, and said movable member having a resilient shoulder adapted to engage a marginal portion of said passage in the base of the holder to retain said member as a locking means on the nut or bolt head in said fully attached position.

4. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers included in the holder engaging the nut or bolt head and retaining the same adjacent said base in the initially attached position of the fastening device in the work opening, a tubular member comprising a sleeve having a flange positioned between the top of said nut or bolt head and said base of the holder with said tubular sleeve projecting through the passage in said base of the holder, said tubular member being adapted to be actuated to move said nut or bolt head axially toward the work from said initially attached position to fully attached position in which the ends of the nut or bolt head expand said outwardly directed attaching elements into positive engagement with the marginal portions of the work opening, and means included in said tubular member defining a resilient shoulder adapted to engage a marginal portion of the passage in the base of the holder to retain said tubular member as a locking means on the nut or bolt head in said fully attached position.

5. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers included in the holder engaging the nut or bolt head and retaining the same adjacent said base in the initially attached position of the fastening device in the work opening, a tubular member comprising a sleeve having a flange positioned between the top of said nut or bolt head and said base of the holder with said tubular sleeve projecting through the passage in said base of the holder, said tubular member being adapted to be actuated to move said nut or bolt head axially toward the work from said initially attached position to fully attached position in which the ends of the nut or bolt head expand said outwardly directed attaching elements into positive engagement with the marginal portions of the work opening, said resilient fingers comprising shoulders adapted to engage and lock the nut or bolt head in such fully attached position.

6. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers on said arms of the holder engaging the nut or bolt head and retaining the same adjacent said base in the initially attached position of the fastening device in the work opening, a tubular member comprising a sleeve having a flange positioned between the top of said nut or bolt head and said base of the holder with said tubular sleeve projecting through the passage in said base of the holder, said tubular member being adapted to be actuated to move said nut or bolt head axially toward the work from said initially attached position to fully attached position in which the ends of the nut or bolt head expand said outwardly directed attaching elements into positive engagement with the marginal portions of the work opening, said resilient fingers on said arms of the holder comprising shoulders adapted to engage and lock the nut or bolt head in such fully attached position, and spring elements included in said tubular member defining resilient shoulders adapted to engage marginal portions of said passage in the base of the holder to retain said tubular member as a locking means on the nut or bolt head in said fully attached position.

7. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers stamped in said arms of the holder engaging the nut or bolt head and retaining the same adjacent said base in the initially attached position of the fastening device in the work opening, a tubular member comprising a sleeve having a flange positioned between the top of said nut or bolt head and said base of the holder with said tubular sleeve projecting through the passage in said base of the holder, said tubular member being adapted to be actuated to move said nut or bolt head axially toward the work from said initially attached position to fully attached position in which the ends of the nut or bolt head expand said outwardly directed attaching elements into positive engagement with the marginal portions of the work opening, said resilient fingers stamped in said arms of the holder comprising shoulders adapted to engage and lock the nut or bolt head in such fully attached position, and spring elements included in said tubular member defining resilient shoulders adapted to engage marginal portions of said passage in the base of the holder to retain said tubular member as a locking means on the nut or bolt head in said fully attached position.

8. A fastening device comprising a nut or bolt head, and a holder for attaching said nut or bolt head in a work opening comprising a piece of sheet metal bent to provide a base extending across the top of the nut or bolt head and provided with a passage, arms extending from said base over the ends of the transverse dimension of the nut or bolt head and terminating in outwardly directed attaching elements adapted to be attached to marginal portions of a work opening, the length of said arms between said base and said attaching elements being materially greater than the thickness of the nut or bolt head, said arms being inclined inwardly toward each other from adjacent said base so that said arms have a spacing accommodating the transverse dimension of the nut or bolt head adjacent said base and a spacing less than the transverse dimension of the nut or bolt head adjacent said attaching elements, resilient fingers stamped in said arms of the holder engaging the nut or bolt head and retaining the same adjacent said base in the initially attached position of the fastening device in the work opening, a tubular sheet metal member comprising a sleeve having a flange positioned between the top of said nut or bolt head and said base of the holder with said sleeve projecting through the passage in said base of the holder, said tubular sheet metal member being adapted to be actuated to move said nut or bolt head axially toward the work from said initially attached position to fully attached position in which the ends of the nut or bolt head expand said outwardly directed attaching elements into positive engagement with the marginal portions of the work opening, said resilient fingers stamped in the arms of the holder comprising inwardly bent wings defining resilient shoulders adapted to engage and lock the nut or bolt head in such fully attached position, and said tubular sheet metal member having longitudinal spring legs stamped therein defining resilient shoulders adapted to engage marginal portions of said passage in the base of the holder to retain said tubular member as a locking means on the nut or bolt head in said fully attached position.

References Cited in the file of this patent

UNITED STATES PATENTS

| | | |
|---|---|---|
| 1,768,505 | Carr | June 24, 1930 |
| 2,404,372 | Hallock | July 23, 1946 |
| 2,495,037 | Tinnerman | Jan. 17, 1950 |
| 2,635,666 | Murphy | Apr. 21, 1953 |